(12) United States Patent
Hartzell et al.

(10) Patent No.: US 9,565,522 B2
(45) Date of Patent: *Feb. 7, 2017

(54) SYSTEMS AND METHODS FOR USING SPATIAL AND TEMPORAL ANALYSIS TO ASSOCIATE DATA SOURCES WITH MOBILE DEVICES

(71) Applicant: Mobile Technology Corporation, LLC, Centennial, CO (US)

(72) Inventors: Dale Hartzell, Boulder, CO (US); Mark Welton, Reston, VA (US); Michael Perri, Centennial, CO (US)

(73) Assignee: MOBILE TECHNOLOGY CORPORATION, LLC, Centennial, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/046,375

(22) Filed: Feb. 17, 2016

(65) Prior Publication Data

US 2016/0165389 A1 Jun. 9, 2016

Related U.S. Application Data

(63) Continuation of application No. 14/731,281, filed on Jun. 4, 2015, now Pat. No. 9,439,033, which is a continuation of application No. 14/509,390, filed on Oct. 8, 2014, now Pat. No. 9,087,346.

(60) Provisional application No. 61/888,950, filed on Oct. 9, 2013.

(51) Int. Cl.
| | |
|---|---|
| *H04W 24/00* | (2009.01) |
| *H04W 4/02* | (2009.01) |
| *G06Q 30/02* | (2012.01) |
| *H04W 12/02* | (2009.01) |
| *H04W 4/20* | (2009.01) |

(52) U.S. Cl.
CPC ............ *H04W 4/02* (2013.01); *G06Q 30/0261* (2013.01); *H04W 4/023* (2013.01); *H04W 4/206* (2013.01); *H04W 12/02* (2013.01)

(58) Field of Classification Search
CPC .............................. G01S 5/0242; H04W 4/025
USPC ......... 455/456.3, 452.2, 456.1, 404.2, 456.5, 455/414.2; 370/328; 707/709; 701/408, 701/207, 461
See application file for complete search history.

(56) References Cited

U.S. PATENT DOCUMENTS

| | | | |
|---|---|---|---|
| 8,135,505 B2 | 3/2012 | Vengroff et al. | |
| 8,521,593 B2 | 8/2013 | Gadhia et al. | |
| 8,792,909 B1 | 7/2014 | Xu et al. | |

(Continued)

OTHER PUBLICATIONS

Decision Granting Ex Parte Reexamination of U.S. Pat. No. 8,792,909, mailed Dec. 19, 2014 (20 pages).
International Search Report and Written Opinion, International Patent Application No. PCT/US14/59541, mailed Jan. 15, 2015. 17 pages.

(Continued)

*Primary Examiner* — Kiet Doan
(74) *Attorney, Agent, or Firm* — Perkins Coie LLP

(57) ABSTRACT

Various embodiments of the present technology generally relate to data delivery. More specifically, some embodiments of the present technology relate to systems and methods for using spatial and temporal analysis to associate data sources with mobile devices. The delivery of data to support a wide variety of services for and about mobile devices that are based on data stored in corporate, commercial, and government databases which is not currently linked to individual mobile devices. Some embodiments allow advertisers to better target their ads to relevant target audience with greater accuracy.

25 Claims, 6 Drawing Sheets

(56) References Cited

U.S. PATENT DOCUMENTS

| | | | |
|---|---|---|---|
| 2002/0111172 | A1 | 8/2002 | DeWolf et al. |
| 2008/0243815 | A1* | 10/2008 | Chan ................. G06F 17/30867 |
| 2009/0125321 | A1 | 5/2009 | Charlebois |
| 2010/0004997 | A1 | 1/2010 | Mehta et al. |
| 2011/0087431 | A1* | 4/2011 | Gupta ....................... G01S 5/02 |
| | | | 701/408 |
| 2011/0208425 | A1 | 8/2011 | Zheng et al. |
| 2011/0213628 | A1 | 9/2011 | Peak |
| 2012/0058782 | A1 | 3/2012 | Li |
| 2012/0088525 | A1 | 4/2012 | Kurokawa et al. |
| 2012/0108259 | A1 | 5/2012 | Weiss |
| 2013/0345957 | A1* | 12/2013 | Yang ....................... G06N 5/02 |
| | | | 701/300 |
| 2013/0345969 | A1* | 12/2013 | Udeshi ................... G01C 21/30 |
| | | | 701/461 |
| 2014/0222570 | A1* | 8/2014 | Devolites ........... G06Q 30/0261 |
| | | | 705/14.58 |

OTHER PUBLICATIONS

Isaacman, Sibren et al. "Identifying Important Places in People's Lives from Cellular Network Data," *Lecture Notes in Computer Science*, vol. 6696, 2011, pp. 133-151 (2011).

Noulas, Anastasios et al. "Exploiting Semantic Annotations for Clustering Geographic Areas and Users in Location-Based Social Networks," in The Social Mobile Web. (2011), 4 pages.

Office Action received for U.S. Appl. No. 14/096,597. Mailed Feb. 27, 2014 by the U.S. Patent and Trademark Office. 8 pages.

Request for Ex Parte Reexamination of U.S. Pat. No. 8,792,909, as filed Nov. 24, 2014 (exhibits omitted) (164 pages).

Zhou, Changqing et al. "Discovering Personally Meaningful Places: An Interactive Clustering Approach." ACM Trans. Inform. Syst. 25, 3, Article 12 (Jul. 2007), 31 pages.

Zoubin Gharamani, "Unsupervised Learning," Gatsby Computational Neuroscience Unit, University College London, UK, Sep. 16, 2004 (32 pages).

\* cited by examiner

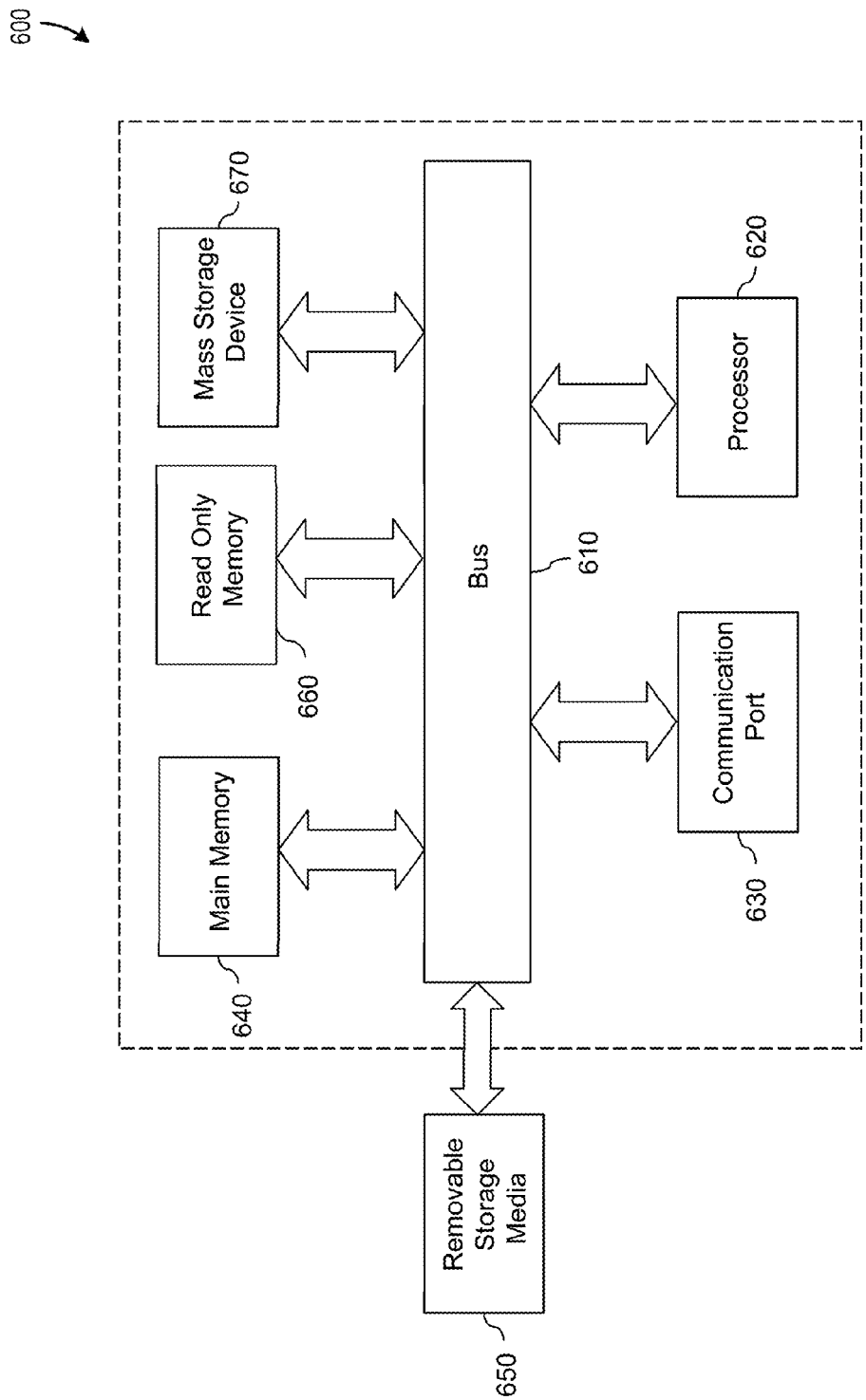

SYSTEMS AND METHODS FOR USING SPATIAL AND TEMPORAL ANALYSIS TO ASSOCIATE DATA SOURCES WITH MOBILE DEVICES

CROSS-REFERENCE TO RELATED APPLICATIONS

This application is a continuation of U.S. application Ser. No. 14/731,281, filed Jun. 4, 2015, which is a continuation of U.S. application Ser. No. 14/509,390, filed Oct. 8, 2014, now U.S. Pat. No. 9,087,346, which claims priority to U.S. Provisional Application Ser. No. 61/888,950 filed Oct. 9, 2013, all of which are incorporated in their entirety herein by reference for all purposes.

TECHNICAL FIELD

Various embodiments of the present technology generally relate to data delivery. More specifically, some embodiments of the present technology relate to systems and methods for using spatial and temporal analysis to associate data sources with mobile devices.

SUMMARY

Various embodiments of the present technology generally relate to data delivery. More specifically, some embodiments of the present technology relate to systems and methods for using spatial and temporal analysis to associate data sources with mobile devices. The delivery of data to support a wide variety of services for and about mobile devices that are based on data stored in corporate, commercial, and government databases which is not currently linked to individual mobile devices. Some embodiments allow advertisers to better target their ads to relevant target audience with greater accuracy.

Some embodiments use location data records from websites, mobile ad networks, mobile applications, and/or networks with sensors located in malls, airports, transportation terminals, hotels, offices, medical offices, elevators, etc. This location data can be used to build location profiles that can be linked to residential addresses through a series of analytical processes. Once a mobile device is associated with a residential address, any database that contains a residential address as a data element can be associated with the mobile device to build enhanced services that can be delivered to the mobile device or can be used to provide services that need information on locations and conditions using mobile devices in an area to build that profile.

In various embodiments, the system may also have the ability to group devices into "social networks" based on analysis of location data overlap for a single location entered into the system, or multiple locations autonomously identified by the system. These social networks can be further analyzed using the corresponding data elements in the linked databases to refine the social networks based on common characteristics found in the data.

Various embodiments may perform one or more of the following functions:
1. Provide identification of mobile devices to an individual or household that can be used to provide matching back to any database that uses an address as a key element to identify the data.
2. Provide identification of mobile devices wherein the system can be used with any type of unique mobile device identifier such as UDID, Wi-Fi MAC Address, Bluetooth ID, browser cookies, or any other persistent or semi-persistent identifier. A semi-persistent identifier is one that exists for some period of time before it is changed, which could be a day, week, month, or more.
3. Provide identification of mobile devices wherein the system can be used with any type of mobile device on a satellite, cellular, or Wi-Fi network, using any type of service plan including subscription, corporate, prepaid, etc.
4. Provide identification of mobile devices wherein the system provides cross-matching of various mobile device identifiers to a single anonymous identifier.
5. Provide identification of mobile devices wherein the system provides anonymization of the data so that privacy is protected when the data is used for commercial purposes.
6. Provide identification of mobile devices wherein the system can be used with any mobile device data that includes the following elements: 1) a mobile device identifier and 2) geo-location tag such as a latitude and longitude pair or other location coding system. A time/date stamp associated with the mobile device data is desirable and may or may not be required for linking devices to a database, but may be required for some applications and analysis to deliver different services.
7. Provide identification of mobile devices wherein the system works with any mobile device location data and accounts for the variance in accuracy of mobile location data depending on the source of the data.
8. Provide identification of mobile devices wherein the system can take both real-time data as well as batch data.
9. Provide identification of mobile devices wherein the system provides for the delivery of linked data to commercial services, businesses, government, and other customers in three ways—1) in response to a query about an individual device, or 2) in response to a query about a location or radius around a location, or 3) in response to a query about a list or group of devices.
10. Provide identification of mobile devices wherein the system does not require any subscriber data from a mobile carrier to link devices back to any database.
11. Provide identification of mobile devices wherein the system does not require any location data from a mobile carrier.
12. Provide identification of mobile devices wherein the system can identify "social networks" of devices with common interests based on location data, which can be linked back to commercial databases for analytical purposes.
13. Provide identification of mobile devices wherein the system can identify "social networks" based on a single selected location input into the system or based on multiple locations that are generated autonomously by the system analysis.

Embodiments of the present technology also include computer-readable storage media containing sets of instructions to cause one or more processors to perform the methods, variations of the methods, and other operations described herein.

While multiple embodiments are disclosed, still other embodiments of the present technology will become apparent to those skilled in the art from the following detailed description, which shows and describes illustrative embodiments of the technology. As will be realized, the technology is capable of modifications in various aspects, all without departing from the scope of the present technology. Accordingly, the drawings and detailed description are to be regarded as illustrative in nature and not restrictive.

BRIEF DESCRIPTION OF THE DRAWINGS

Embodiments of the present technology will be described and explained through the use of the accompanying drawings in which:

FIG. 6 illustrates an example of a computer system with which some embodiments of the present technology may be utilized.

Figure 1:
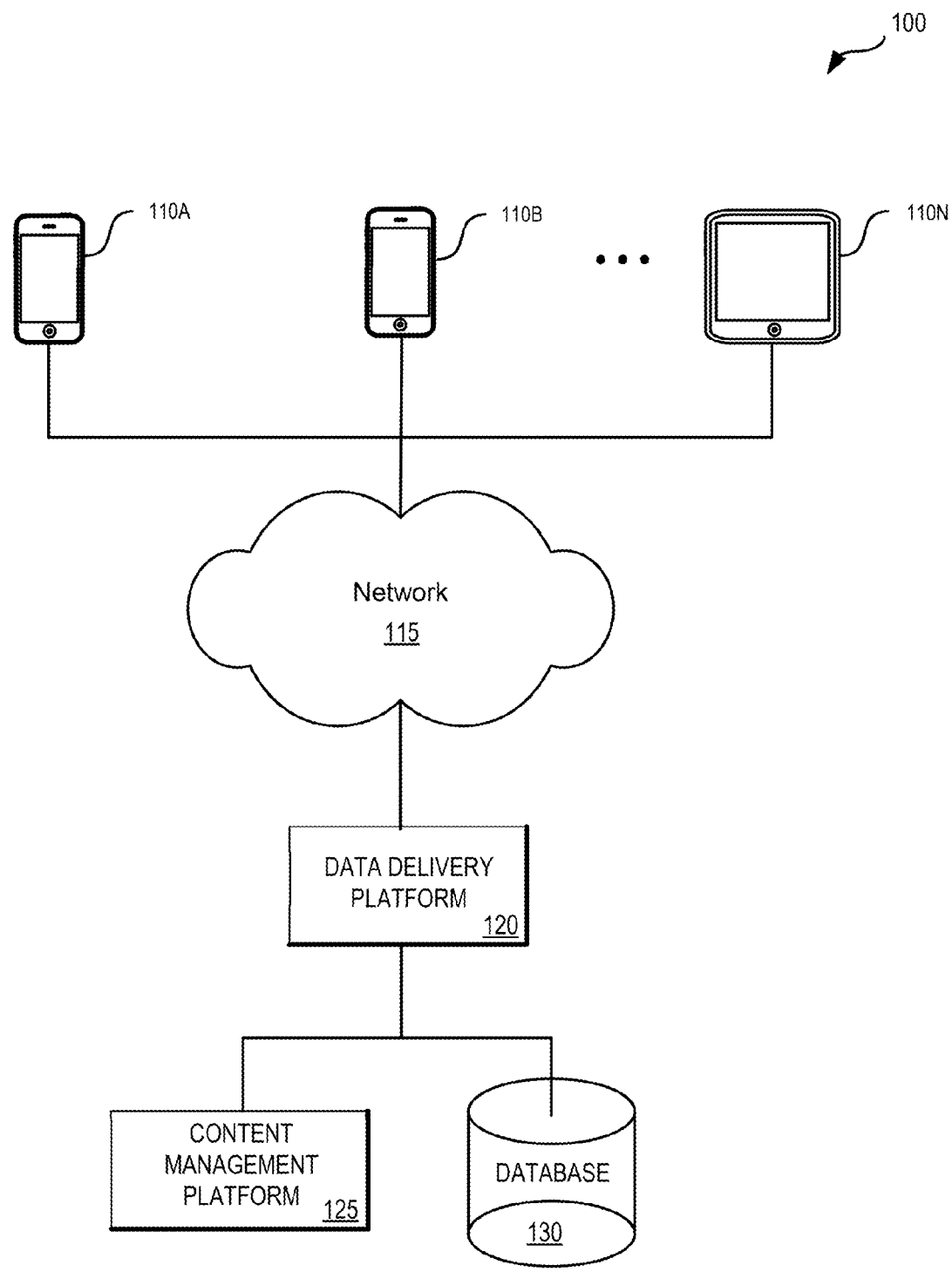
FIG. 1 illustrates an example of a networked-based environment in which some embodiments of the present technology may be utilized.

The drawings have not necessarily been drawn to scale. For example, the dimensions of some of the elements in the figures may be expanded or reduced to help improve the understanding of the embodiments of the present technology. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Various embodiments of the present technology generally relate to data delivery. More specifically, some embodiments of the present technology relate to systems and methods for using spatial and temporal analysis to associate data sources with mobile devices. Some embodiments enable the delivery of data to support a wide variety of services for and about mobile devices that are based on data stored in corporate, commercial, and government databases, which is not currently linked to individual mobile devices accurately. One application of this technology is to allow advertisers to better target their ads to relevant target audience with greater accuracy. The technology uses location data records from mobile ad networks, mobile applications, and hundreds of networks with sensors located in malls, airports, transportation terminals, hotels, offices, medical offices, elevators, etc. This location data can be used to build location profiles that can be linked to residential addresses through a series of analytical processes.

Once a mobile device is associated with a residential address, any database that contains a residential address as a data element can be associated with the mobile device to build enhanced services that can be delivered to the mobile device or can be used to provide services that need information on locations and conditions using mobile devices in an area to build that profile. This information can also be used to build "social networks" identifying individuals with common interests, associations, and social dynamics to provide additional insight into the mobile user.

A substantial amount of data on each individual and household is stored in corporate, retailer, government, and marketing databases. This data can include any type of data collected today—demographic data, psychographic data, behavioral data, purchase data, interest data, crime data, occupation data, registration data, survey data, medical data and more. This data can be used for a variety of purposes that include advertising, marketing, location studies, public safety, healthcare and more. There are many technologies for capturing location data from mobile devices and building historical location profiles associated with a device.

The challenge is linking the mobile device to an individual or household so that the data from these existing databases, which are typically keyed by name and address, can be used to provide enhanced services to the users of mobile devices and expand services for advertisers, businesses, and government leveraging location data from mobile devices. Even where these commercial and government databases have a mobile telephone number in the database, these are still not easily linked to mobile devices for the delivery of other services. Mobile applications and services only have access to device ID keys, mobile data network ID keys, Wi-Fi network keys, Bluetooth IDs, cookies and software defined persistent and transient device identifiers that do not exist in those databases.

Identifying the household address associated with a mobile device can be done by mobile carriers from their billing and provisioning databases, but this information is not made available to other service providers and government agencies. To provide enhanced services, these commercial and government agencies need an alternative solution that can accurately identify a mobile devices household address to link to their data that does not rely on mobile carrier data or databases.

One of the leading trends in marketing is social-based marketing through the use of social networks with the intent of reaching like-minded consumers based on their common social interests and affiliations. Unfortunately, the ability to reach these audiences is controlled by a few large social networking companies that dictate the way that advertisers can reach and interact with these consumers. Mobile devices provide tremendous reach for advertisers and being able to reach social networks and interest groups independent of these large social networking companies provides new ways to advertise and interact with these consumers. It is especially powerful if these social networks and interest groups can be linked to the commercial and marketing data associated with these consumers, allowing richer analytics to be performed on these groups and enabling predictive modeling to find similar types of customers.

The challenge is trying to identify the mobile devices in a social group or interest group. Mobile advertising networks, mobile apps, and mobile websites have billions of records associated with mobile transactions that can be mined to create these social networks "graphs" that link devices and hence the individuals together. Various embodiments of the present technology provide a solution to this challenge.

In the following description, for the purposes of explanation, numerous specific details are set forth in order to provide a thorough understanding of embodiments of the present technology. It will be apparent, however, to one skilled in the art that embodiments of the present technology may be practiced without some of these specific details.

Moreover, the techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions that may be used to program a computer (or other electronic devices) to perform a process. The machine-readable medium may include, but is not limited to, optical discs, compact disc read-only memories (CD-ROMs), magneto-optical discs, ROMs, random access memories (RAMs), erasable programmable read-only memories (EPROMs), electrically erasable programmable read-only memories (EEPROMs), application-specific integrated circuits (ASICs), magnetic or optical cards, flash memory, or other type of media/machine-readable medium suitable for storing electronic instructions.

Terminology

Brief definitions of terms, abbreviations, and phrases used throughout this application are given below.

The terms "connected" or "coupled" and related terms are used in an operational sense and are not necessarily limited to a direct physical connection or coupling. Thus, for example, two devices may be coupled directly, or via one or more intermediary media or devices. As another example, devices may be coupled in such a way that information can be passed therebetween, while not sharing any physical connection with one another. Based on the disclosure provided herein, one of ordinary skill in the art will appreciate a variety of ways in which connection or coupling exists in accordance with the aforementioned definition.

The phrases "in some embodiments," "according to some embodiments," "in the embodiments shown," "in other embodiments," and the like generally mean the particular feature, structure, or characteristic following the phrase is included in at least one implementation of the present technology, and may be included in more than one implementation. In addition, such phrases do not necessarily refer to the same embodiments or different embodiments.

If the specification states a component or feature "may", "can", "could", or "might" be included or have a characteristic, that particular component or feature is not required to be included or have the characteristic.

The term "module" or "engine" refers broadly to general or specific-purpose hardware, software, or firmware (or any combination thereof) components. Modules and engines are typically functional components that can generate useful data or other output using specified input(s). A module or engine may or may not be self-contained. Depending upon implementation-specific or other considerations, the modules or engines may be centralized or functionally distributed. An application program (also called an "application") may include one or more modules and/or engines, or a module and/or engine can include one or more application programs.

General Description

FIG. 1 is a block diagram of network-based environment 100 in accordance with one or more embodiments of the present technology. As illustrated in FIG. 1, user devices 110A-110N may use network 115 to submit and retrieve information from data delivery platform 120. User devices 110A-110N can interact with data delivery platform 120 through an application programming interface (API) that runs on the native operating system of the device, such as IOS® or ANDROID™. Through data delivery platform 120, mobile device users can be targeted for the delivery of customized data by data delivery platform 120 using, for example, spatial and temporal analysis to associate data sources with mobile devices. Content management platform 125 enables the delivery of data stored in database 130 to support a wide variety of services for and about mobile devices that are based on data stored in corporate, commercial, and government databases, which are not currently linked to individual mobile devices accurately.

For example, data delivery platform 120 can use location data records from websites, mobile ad networks, mobile applications, and hundreds of networks with sensors located in malls, airports, transportation terminals, hotels, offices, medical offices, elevators, etc. This location data can be used to build location profiles that can be linked to residential addresses through a series of analytical processes. Using this information, a customized profile can be built around the mobile device.

User devices 110A-110N can be any computing device capable of receiving user input as well as transmitting and/or receiving data via the network 115. In one embodiment, user devices 110A-110N can be any device having computer functionality, such as a personal digital assistant (PDA), mobile telephone, smartphone, wearable computing device (e.g., including eyewear, watches, etc.) tablet, or similar device. User devices 110A-110N can be configured to communicate via network 115, which may comprise any combination of local area and/or wide area networks, using both wired and wireless communication systems. In one embodiment, network 115 uses standard communications technologies and/or protocols. Thus, network 115 may include links using technologies such as Ethernet, 802.11, worldwide interoperability for microwave access (WiMAX), 3G, 4G, CDMA, digital subscriber line (DSL), etc.

Similarly, the networking protocols used on network 115 may include multiprotocol label switching (MPLS), transmission control protocol/Internet protocol (TCP/IP), User Datagram Protocol (UDP), hypertext transport protocol (HTTP), simple mail transfer protocol (SMTP) and file transfer protocol (FTP). Data exchanged over network 115 may be represented using technologies and/or formats including hypertext markup language (HTML) or extensible markup language (XML). In addition, all or some links can be encrypted using conventional encryption technologies such as secure sockets layer (SSL), transport layer security (TLS), and Internet Protocol security (IPsec).

The various components illustrated in FIG. 1 can be coupled to network 115 using various types of network communication mechanisms. These network communication mechanisms may communicate with other electronic devices by transmitting and receiving wireless signals using licensed, semi-licensed or unlicensed spectrum over network 115. In some cases, network 115 may be comprised of multiple networks, even multiple heterogeneous networks, such as one or more border networks, voice networks, broadband networks, service provider networks, Internet Service Provider (ISP) networks, and/or Public Switched Telephone Networks (PSTNs), interconnected via gateways operable to facilitate communications between and among the various networks. Network 115 can also include third-party communications networks such as a Global System for Mobile (GSM) mobile communications network, a code/time division multiple access (CDMA/TDMA) mobile communications network, a 3rd or 4th generation (3G/4G) mobile communications network (e.g., General Packet Radio Service (GPRS/EGPRS)), Enhanced Data rates for GSM Evolution (EDGE), Universal Mobile Telecommunications System (UMTS), or Long Term Evolution (LTE) network, or other communications networks.

Figure 2:
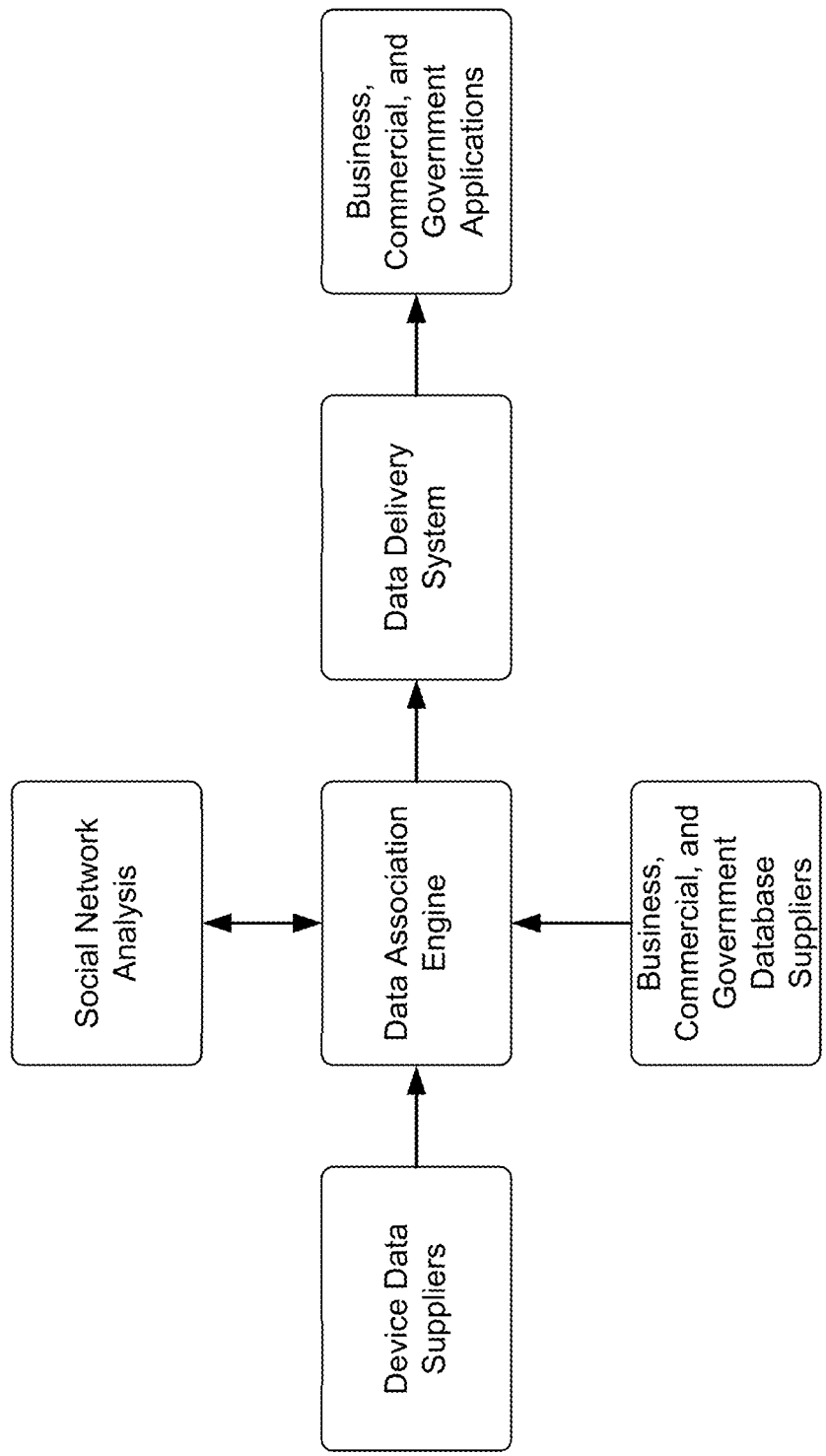
FIG. 2 illustrates various components and interactions in accordance with one or more embodiments of the present technology.

FIG. 2 illustrates various components and interactions in accordance with one or more embodiments of the present technology. The system may associate the data in business, commercial, and government databases with mobile device data that comes from a variety of suppliers of suppliers that include mobile ad networks, mobile carriers, mobile applications, businesses, Wi-Fi networks, and any other viable source. The components illustrated in FIG. 2 provide some examples of the means for perform various operations described.

In some cases, the system collects mobile device data. This mobile device data may include event data such as, but not limited to the following: mobile network call data, mobile data network registration and usage, mobile device location data, mobile device browsing and web data, transaction data, mobile application data, social media data, purchase data, login data, device sensor data, credit card data, etc. The mobile device event data can include one or more the following fields: 1) a device identifier, such as UDID, MAC address, cookie, or any other permanent or semi-permanent identifier; 2) location information, typically in Latitude and Longitude or addresses; 3) a timestamp that includes date and time, in minutes and seconds. Note that not all data has to contain a timestamp to provide basic matching. A timestamp may be used, in some embodiment, to cross-match data sources with different device identifiers.

The mobile device event data can be clustered by location, device identifiers, and time of day. These clusters are then evaluated against household address data. This address data is then used to link the mobile device ID with the other databases. As part of this process, the system anonymizes the data to provide enhance security for the gathered and linked data and ensure that Personally Identifiable Information (PII) is not disclosed to anyone. As part of the process, anonymous IDs can be created so that PII is never disclosed when the data is used by the customer applications.

Figure 3:
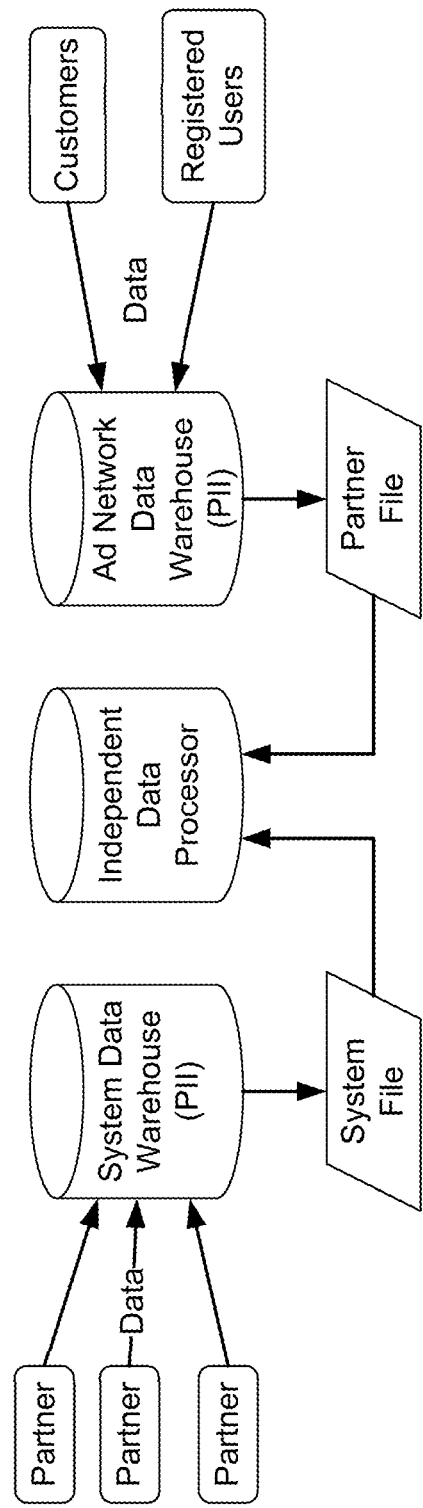
FIG. 3 is a block diagram illustrating various data and partner components in accordance with various embodiments of the present technology.

FIG. 3 is a block diagram which illustrates the use of an independent data processor to match the output data from the system to the data provided by ad network partners. Because PII is used in the matching process, the independent data process is used to prevent either the system or the ad network partner from accessing the PII. The output result from the data processor is the linked data that matches from both data sources.

As illustrated in FIG. 3, the system can collect raw mobile device data and commercial, corporate, and governmental data on individuals from a variety of partners. This data can be processed by the system in FIG. 2 and used to create a System Data Warehouse that contains PII as a key. The system can output the data warehouse into a system file that can be transmitted to other parties, including Independent Data Processors.

Similarly, Partners such as Ad networks also collect customer information from customers of partner services (applications, websites, etc.) as well as registered users of these partner services, which can similarly be accumulated into the Ad Network Data Warehouse. The Ad Network Data Warehouse can also use the PII as a key. The Ad Network Data Warehouse can also be output as a Partner File for transmission to Independent Data Processors.

The Independent Data Processor takes the System File and Partner File and compares the PII keys. The Independent data processor creates an output file that contains combined records from the System File and the Partner File only for records with matching PII keys from both files. In some embodiments, if a record with a PII key is unique to only one of the files, it is not included in the output. The merged file is then transmitted to the Ad Network Partner for use. In various embodiments, the system can ensure that no PII data is shared with either the System or the Ad Network Partner for individuals that are not already known to them.

Figure 4:
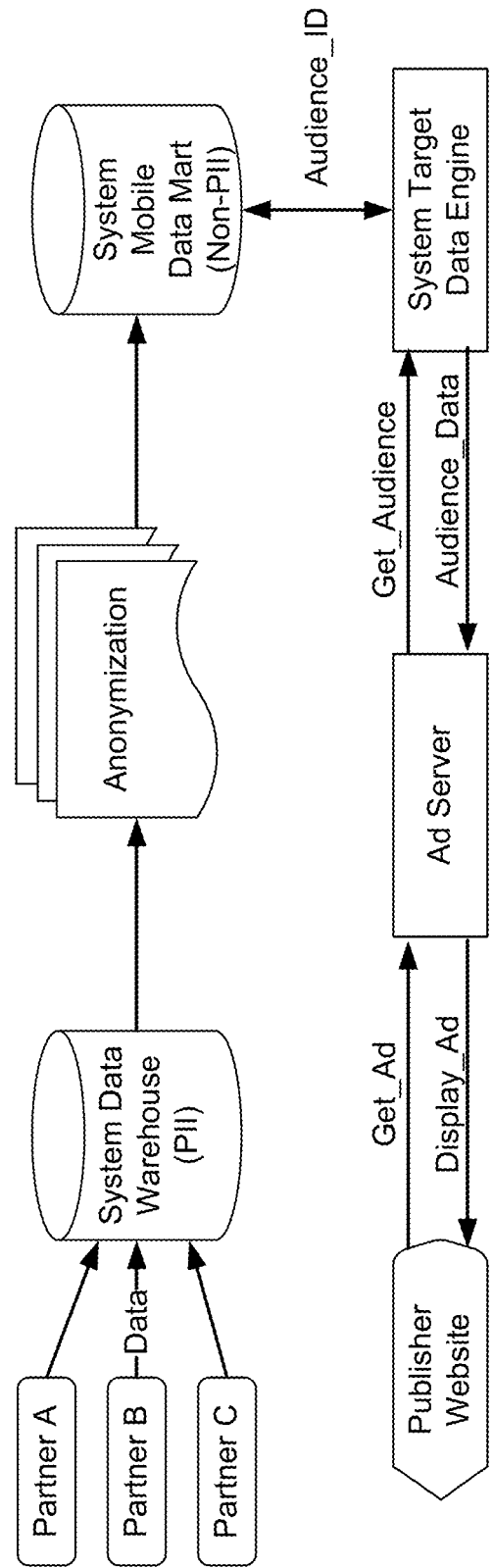
FIG. 4 is a block diagram illustrating the use of anonymized requests by ad network partners to retrieve data from the system in accordance with some embodiments of the present technology.

FIG. 4 is a block diagram illustrating the use of anonymized requests by ad network partners to retrieve data from the system in accordance with some embodiments of the present technology. One advantage of using anonymized requests, it that this eliminates the need to expose PII while providing real-time access to the system output.

As illustrated in FIG. 4, the system collects raw mobile device data and commercial, corporate, and governmental data on individuals from a variety of partners. This data is processed by the system in FIG. 2 and used to create a System Data Warehouse that contains PII as a key. The system then processes the System Data Warehouse through an anonymization process that removes or modifies the PII with data that cannot be directly linked to the PII. One way of doing this is some sort of one-way hashing algorithm so that data cannot be converted back to the original PII by anyone, but other methods that include matching tables used internally to the System to map PII to non-PII data could be used, but are far less secure since the matching tables themselves are potentially vulnerable. The Anonymized data can be stored, for example, in a real-time accessible System Mobile Data Mart.

When a Publisher Website (or mobile app) makes a request to a Partner Ad Server, the Ad Server in turn makes a request to the System Target Data Engine with provides an external interface to the System Data Mart. The System Target Data Engine takes the anonymous key passed in by the Ad Server and looks up the data in the System Mobile Data Mart. The data returned by the System Data Mart is transmitted to the Ad Server, which in turn uses the data to make decisions on what ad to return to the Publisher.

Figure 5:
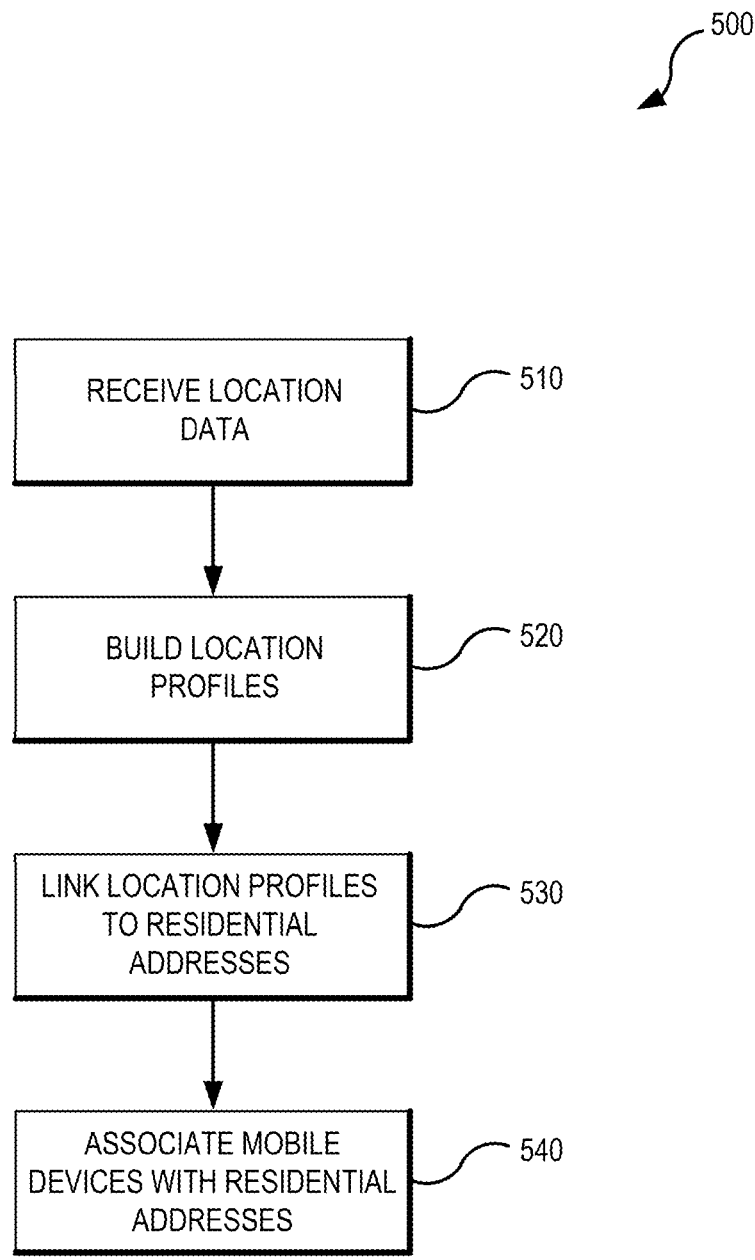
FIG. 5 is a flowchart illustrate an exemplary set of operations for associating mobiles devices with residential addresses in accordance with one or more embodiments of the present technology.

FIG. 5 is a flowchart illustrating an exemplary set of operations for associating mobiles devices with residential addresses in accordance with one or more embodiments of the present technology. The operations illustrated in FIG. 5 may be performed by various means including, but not limited to, data analysis platform 120, content management platform 125, database 130, one or more servers, one or more processors, networks and networking hardware, various modules or engines (e.g., a receiving module, a profiling module, a linking module, an association module, etc.), and/or one or more computing systems such as those described in FIG. 6 below. As illustrated in FIG. 5, location data can be received from one or more sources during receiving operation 510. Using this information, the building operation 520 can build location profiles that can be linked to residential address during linking operation 530. Association operation 540 can then using this information to associate mobile devices with residential addressed.

Data Operational Flow

Various embodiments of the system for linking mobile device data with other databases using spatial and temporal analysis can includes one or more of the following components and processing algorithms, which can be executed on commercially available servers, using real or virtual servers organized into server clusters. In accordance with various embodiments, the system may perform one or more of the following seven functions:

Function 1: Processing of the Mobile Device/Location Event Data

Mobile device/location event data can be transmitted to the system in batch file format or in real time via Application Program Interfaces (APIs) provided to the data suppliers. Batch files transferred to the system use standard secure File Transfer Protocol (FTP) technology. Real-time transfers are done per event and use Application Program Interfaces (APIs) built using the WS02 open-source platforms. The APIs may be built using JavaScript Object Notation (JSON) and provide a way for the partner to transmit data to the platform while requesting data. In some embodiments, the elements transmitted for any mobile device/location record via the batch file or AP may contain at a minimum:

Device ID—Possible Device IDs include, but are not limited to:
  Mobile phone #
  Unique Device Identifier (UDID)
  International Mobile Equipment Identity (IMEI)
  Mobile Equipment Identifier (MEID)
  Electronic Serial Number (ESN)
  Media Access Control (MAC) address (MAC-48/EUI-48/EUI-64)
  Bluetooth Address (BD_ADDR)
  Date: MMDDYY
  Time: HH:MM:SS
  Latitude: integer
  Longitude: integer
  Partner ID: Assigned by E2M for real-time feeds The mobile event data can be considered PII because it contains a unique identifier for each mobile device. While it can be transmitted to the system from the data provider "in the clear", typically the mechanism involves a secured connection and the Mobile Device ID data is encoded using an agreed upon obfuscation algorithm, such as hashing, prior to sending the data to the system. Once data is received by the system it ensures that all Mobile Device IDs are obfuscated prior to being stored in the system databases and used for processing. This obfuscation can be performed, for example, by the data provider prior to transmission or by the receiving system using a SHA-1 hashing algorithm, which is a one-way hash that cannot be reversed back to the original data. Any other comparable one-way hashing or encoding algorithm could be substituted for the SHA-1 algorithm.

The incoming mobile event data is processed through a series of filters that organize data in the system by the Mobile Device IDs. The data can be organized so that it can be processed in different priorities or evaluated differently during subsequent processing. These filters can include, but are not limited to, the following:

Time/date filters—data can be segmented by event dates/times and timestamps can be normalized to a single time zone or multiple distinct time zones, even if the data is from systems that store times using different default time zones. For example, one filter tags records that occur between 6 pm and 6 am, giving them a higher priority for the location analysis.

Location data cleansing—these filters ensure the location data is accurate by:
  Correcting or eliminating records with invalid latitude/longitude data that has been reversed by the provider, is missing leading minus signs, or is missing altogether.
  Discarding records with default or "blacklisted" locations. The processing performed while identifying addresses associated with a mobile device creates a blacklist of locations that occur frequently from a particular provider (ad network or publisher) that are not valid locations for the device.
  Adjusting the accuracy resolution of the data across sources for processing based on the source. Depending on the data source we may round the latitude/longitude data to a specific number of decimal places to normalize the resolution across different data sources or weight the data points based on the accuracy associated with the source. This weighting could be applied based on the source or other information contained in the data provided, or could be defined in the system for each source or each data point individually. Note that this process may also be applied to previously processed or stored location data to continuously improve the quality of results in the system.
  Discarding location data associated with devices that have been marked by the system as inactive or deleted. The system may use a number of methods such as analyzing the time since the last data point reported for a device, mobile carrier registration data, or other means to identify a particular device as no longer in use. Once a device is marked, filters can be used when processing historical location data to eliminate data points from these devices from processing.

Mobile device ID filters—these filters evaluate the mobile device IDs passed to the system to check against existing IDs, as well as identifying what other mobile device IDs may be associated with the same device.

Once the mobile event data has been processed through the filters and stored in the database it is ready for location analysis. Location analysis is the process by which the system analyzes all of the filtered mobile event location data associated with an individual device to identify the locations most frequently associated with the mobile device. This processing uses a Density-Based Scan algorithm to group these data points and find the central location of these groups of data points. Note that any other type of grouping algorithm could be employed.

The Density-Based Scan can consider each mobile/location record latitude/longitude pair as a single point for clustering analysis. Clustering is performed for each Device ID using various algorithms. The algorithms may use the following two parameters:

Eps (e): Maximum radius of the neighborhood points. Current embodiments use 30 feet, but are able to adjust settings to balance accuracy vs. processing time.

MinPts: Minimum number of points in an Eps-neighborhood (specified radius). Current embodiments use 10 for this value, but other settings may be used to balance accuracy vs. processing time.

The algorithm may identify clusters of points that meet the density requirement of the MinPts within the Eps. Each data point can then be categorized. Some embodiments use the following categories:

A core point is one that has more than a specified number of points (MinPts) within Eps. These are points that are at the interior of a cluster.

A border point has fewer than MinPts within Eps, but is in the neighborhood (within the Eps) of a core point A noise point is any point that is not a core point or a border point. These points are ignored The cluster algorithm of one or more embodiments can work by:
- Arbitrarily selecting a point p.
- Retrieving all points density-reachable from p w.r.t. Eps and MinPts.
- If p is a core point, a cluster is formed.
- If p is a border point, no points are density-reachable from p and DBSCAN visits the next point of the database.
- Continuing the process until all of the points have been processed The result of cluster processing may be a list that contains the core point locations and number of data points associated with the location. These locations can then be ordered from highest to lowest frequency based on the number of data points associated with the location. The location generated is a geo-location coordinate using latitude and longitude, although any location reference system could be used.

Function 2. Identifying Street Addresses Associated with Each Mobile Device

Once the mobile event data has been processed and the resulting list of locations is generated for each device, these locations can be used in one of two ways to associate with data sources: 1) the location identifier, e.g., latitude/longitude, associated with the pair can be compared with location identifiers stored with the data sources. If the data source uses a street address and does not include a location identifier, then as part of the input data processing for these sources the system will generate a location identifier that can be used for comparison. 2) The second method is to convert the locations generated for each device to street addresses (e.g., 123 Main Street, Anytown, CO, 80301) using commercially available reverse geocoding services or databases. This processing seeks to identify two primary addresses for each device:

- A residential address: The residential address is essential for linking the mobile device to the commercial, business, and government databases that use residential address as a key field. The residential address match will potentially match many devices to the same residential address, even if the address is a single family home, since there are multiple devices and multiple individuals in the household. This is considered a "household" level match for returning data from the databases. One anomaly with this is multi-family residences, such as apartment buildings. Because the geo-location data being used cannot distinguish apartment numbers or floor differences, multiple households will have the same address for the multi-family residences.
- A "commercial" address: This could be a business, school, retail, or other commercial address. Because the residential address matches at the household level for a single-family home, the daytime address is essential for identifying an individual with a single-family residence, or a household or individual within a multi-family residential unit. The daytime address is compared with additional databases that include Point-of-Interest data, business directories, and other data sources that can be used to identify commercial and public entities at a location.

The quality of the address returned by the commercial reverse geocoding services varies widely, trying to return the closest street address to the geocode passed in. These addresses are then compared with the addresses used as keys in the commercial databases that contain the profile information. In some embodiments, the system analyzes the returned address against the commercial databases and categorizes it into one of the following categories:

- Exact Match Addresses—addresses that are found in the commercial databases
- Exact Match with city Aliases—addresses that are found in the commercial databases when a city alias is used. Some cities have a different name in their postal address from the geocode address.
- Not Exact Match: But Very near to address—addresses where the street number does not match exactly but can be matched to a street number within +/−N house numbers of the address (where N can be defined in the system).
- Not Exact Match: But very near to address with city aliases: addresses where the street number does not match exactly but can be matched to a street number within +/−N house numbers of the address when a city alias is used (where N can be defined in the system).
- Not Exact Match: But slightly far from address—addresses where the street number does not match exactly but can be matched to a street number between N and M house numbers from the address (where N and M can be defined in the system).
- Not Exact Match: But slightly far from address with city aliases—addresses where the street number does not match exactly but can be matched to a street number between N and M house numbers of the address when a city alias is used (where N and M can be defined in the system).
- Not Exact Match: But very far from address—addresses where the street number does not match exactly but can be matched to a street number outside +/−M house numbers of the address (where M can be defined in the system).
- Not Exact Match: But very far from address with city aliases—addresses where the street number does not match exactly but can be matched to a street number outside +/−M house numbers of the address when a city alias is used (where N can be defined in the system).
- Cannot match address—unable to meet any match criteria
- Cannot match address even after aliases—unable to meet any match criteria even with a city alias is used.
- Addresses that are not able to be matched
- Cannot match address: No Lat/Long or Dummy Lat/Long—no address can even be returned by the reverse geo-coder These categories can be used to rate the quality of the match returned and improve the quality of the data being provided. These categories can also be used to rate the quality of location data points created from street addresses when creating location data points from street addresses for commercial data sources in the system.

Function 3. Linking Mobile Device ID to Data Sources at the Household and Individual Level Once the residential address associated with a device has been identified, it can be linked to data provided in any database that uses this as a key element. These data bases can be commercial, business, marketing, government, law enforcement, healthcare or any other database containing household or individual information.

Matching devices with this household and individual data using the residential address will result in a one-to-one match for households with only one person, or a many-to-many match for households with multiple individuals—at a multiple individual household there will be many devices associated with the address that need to be matched to the individuals in the household. For a multi-family unit, such as an apartment building, there will be multiple devices matched to the address that must then be first matched with a specific household in the residence and then in turn to the individuals within the specific household. While it is useful to make a device match at the household level, it is even more desirable to be able to identify the devices associated with a single individual within a household, or to identify households within a multi-family residential unit.

To match devices to individuals within a household or multi-family residence an analysis of the non-residential location clusters associated with each device ID can be used. The easiest is the identification of Individuals within a household. The system uses external data sources that provide data for each individual in a household that may be used to correlate with the characteristics of a location cluster. These data sources can be marketing data providers, online databases such as LinkedIn and Hoover's, Point of Interest databases, or other databases that contain information relevant to a location that can be associated with the location cluster that may be useful in comparing with known data on the individual, such as interests, hobbies, recreational activities, purchases, etc.

By comparing the data associated with the non-residential locations generated for each device with the known data for an individual is possible to uniquely identify the individual associated with a device. Similarly, age information can compared with location records that correspond with schools to uniquely identify other family members. Throughout this process, devices can be associated with the individual members of a household, and by virtue of elimination can potentially be linked to individuals where a direct data match is not achieved. The identification of individuals is particularly important for services that are prohibited from measuring, tracking, analyzing, or serving children.

The identification of individuals within a multi-family residential address is performed in a similar manner with one enhancement. Additional processing is performed first to identify the devices associated with each household in a multi-family residence. This processing uses overlap analysis of the data for each mobile device to determine which devices have a large number of locations in common, indicating the individuals for these devices are frequently together as members of a household are. Once devices are identified with households, the same processing used to identify individuals within households can be performed to identify individuals.

Function 4. Linking Mobile Device ID without Residential Location Data

Some sources of mobile event data provide data that comes only from commercial or public locations and does not Include any residential locations after processing. In order to match the mobile device IDs associated with this "non-residential" data (NR data) back to the residential-based data sources, the data can be linked to other IDs that are already linked to those data sources.

This process can use an overlap analysis of the event location and timestamp data from the NR data against the event location and timestamp data from the linked sources. In some embodiments, this analysis can build probable matches based on number of overlapping occurrences, and also allows variation in timing of events from the different sources, since finding exact matches is rare.

Some embodiments of the overlap analysis can include the following steps:
1) Each record from the NR data is compared by location against the location records from data sources that include residential data.
2) For records with locations that match, the timestamps are compared to the timestamp of the NR record (t) to find records within a specific variance, N. Records that are within the window of t−N to t+N are considered probable matches for the device.
3) A count can be created by device ID from the residential data sources that are probable matches for the device ID from the NR data. These counts are then ordered from largest to smallest, with the largest representing the most probable match between the two data sets.
4) The residential data source device IDs for the probable matches are then compared against the probable matches for all other NR data devices to determine if multiple NR device IDs are probable matches for the same residential data device ID. If more than one device is a probable match, they are ordered by the highest number of matches.

This process is repeated with existing NR data using different parameters or as new NR data is acquired and as new residential data is acquired to improve the results and obtain the highest quality matches possible. Once a match is obtained, all of the household and individual data that was linked to the residential data device ID can now be linked to the NR data device ID also.

This process can be performed for any device data that does not include residential locations, such as public Wi-Fi data, Blue-tooth data, Digital-Out-of-Home sensor data, in-store sensor data, etc.

Function 5. Identifying "Social Network" Groups

Unique groupings of devices can be created through additional location and data analysis. These "social networks" identified can be sold as unique audiences that are used to reach socially connected groups without having to rely on traditional social network sites such as Facebook to provide the data. The additional value of the groups created by the system analysis is that these are real-life groups that socialize in person, not just online groups that may be virtual only.

Various embodiments may use various methods for identifying social network groups: 1) for a specific Input location or location/date/time, or 2) autonomous multi-location based groups. Each type of group has different benefits to advertisers. Specific location-based groups tend to be larger groups that identify macro audiences, such as audiences that show interest in a particular kind of sporting event, entertainment, or type of retail category. Multi-location groups are smaller groups that exhibit more interest characteristics in common, providing a more focused audience.

In accordance with some embodiments, the processing to identify a social network group from a set of mobile device location or event data can include the following steps:
1) Processing the data as described in "Function 1" of the "Data Operational Flow" above, with the following modification. Instead of grouping data by device prior to performing the clustering algorithm, the data source can be grouped by discrete date and time segments, e.g. October 5 from 12:00 pm to 12:15 pm, and is then run through the clustering algorithm. This generates clusters based on locations, with multiple devices per cluster. This is done for multiple date/time segments.
2) Using an algorithm to compare the devices present in one cluster from one date/time segment with the devices present in the clusters of other date/time segments and identifying which devices occur together in many different clusters across different date/time segments.
3) Using an algorithm to score the quality of the probable association between devices identified in 2) above, and 4) Create a database identifying the "social group" of devices with a unique identifier for each group.
5) A list of devices that contain location records is created by the system and given a unique group ID for future reference.

The processing to identify a social network group by the system autonomously is a bit more involved due to the amount of data that must be processed. The steps to create the social network group autonomously, in accordance with one or more embodiments, can include:
1) System sorts and segments all the location records in the system by date and time blocks within each date. Time blocks can be specified in N minute increments. For example, a time block of 15 minutes (N=15) would group all records from a specific date into separate groups for times 00:00 to 00:14, 00:15 to 00:29, 00:30 to 00:44, etc. for the entire 24 hour period.
2) The location coordinates in each time block are grouped using the same type of clustering algorithm described in Function 1 above. The resulting groups are by location and include all devices, and will result in multiple groups being created for each time block. These groups are given interim group identifiers, e.g., T1G1, for time block 1, group 1.
3) The system can then create a table with rows that represent an individual device ID and columns that represent group identifiers. If a device is present in a group, the corresponding cell may be marked with an indicator (1, true, etc.). If a device is not present in a group the cell may be left empty.
4) The system can then analyzes a device at a time against all other following devices doing a row by row comparison. If another device has at least Z location group overlaps (where both devices have a "1" in the location group), where Z is entered by the operator and variable, then the two devices are put into a new table that is keyed by Social Group ID (SG0, SG1, SG2, etc.), with a list of devices associated with each social group. Each time a device is added to a new social group, a counter is updated in the device list.
5) The system repeats the process with the next device, but only compares against subsequent devices, not those previously analyzed.
6) Once all devices have been analyzed, there will be a large table of social groups identified by the system. A single device may be in zero, one, or more of the social groups identified.
7) The counters from the device list can be used to identify and rank social influencers based on their reach (most groups to fewest groups).
8) The social group table can also be processed in a relationship graph format to identify relationships between groups.

The system can also augment the social networks by overlaying the data from the linked databases to provide characterization of the social groups as well as further segment them by these criteria to create subgroups. This process can be repeated using different time segments and/or new or modified data to improve results, identify changes, and increase the confidence level of the quality of the social groups identified.

Function 6. Delivering Data to Applications

Once the mobile devices have been linked to households and individuals within the various databases, it can be delivered to consumer applications for a variety of commercial, public safety, and other uses. Consumer in this case specifies any mobile, web-based, or other type of application that uses the data to provide a service based on that data. The first implementation supports ad targeting for mobile ad networks by delivering interest data to those networks, but can be used for any application that is based on using mobile devices or location information.

The service can provide real-time or historical information from databases to the consumer application. These applications can receive the data from the system as a file transfer or a web-based synchronous or asynchronous service based on JSON or other similar protocols. The two primary modes of providing data to the consumer application are: 1) device specific requests and 2) location requests.

A device specific request is designed to return household or individual information associated with a specific device. For this service the consumer application passes the system a mobile device ID, properly encrypted or obfuscated, and the service returns a set of anonymized data associated with that device ID.

A location request can take two forms, but in each the consumer application passes in a location, usually in latitude/longitude format, that it is requesting information from the system. The first type of location request generates a combined response for all mobile devices that are within a certain radius of the location. The second generates an individual level response for all the devices within a certain radius of the location. For both types of requests, the system uses real-time mobile event data to identify the mobile device IDs near the requested location.

The combined response request builds an aggregated view of all the devices. This is often used for marketing type of services, where they are looking for the characteristics of the group. In this response the system combines the data for each data field to be returned and provides a weighed percentage of the values in each data field. For example if one of the data fields was "male", and there were 10 devices identified near the location with 3 that linked to data that marked the field as "yes", then the system would return a response to the consumer application that tells it how many total devices, and that "male" is 30%.

The individual response request can build an array of all the data by individual device and passes this back to the consumer application. This allows the consumer application to look at each individual's data separately. It is important to note that the system may or may not return the encoded device ID as part of this service.

Targeting Data for Partner Use

The system does not serve advertisements. In order to provision the data for online advertising use and deliver targeted offers to consumers the system shares aggregated Buyer Audience Data, i.e. Furniture Buyers, with selected Ad Serving, Publishing or Ad Network partners as described below. There are 4 ways this can be done.

Option 1: Provisioning of Audience Level Data at Ad Network Via PII Match

The system provides data to an Independent Data Processor to be the third party partner to perform a Personally Identifiable Information (PII) based database match with other NAI Members. Typically, some or all of the following fields are used for matching—Mobile number, Device ID, MAC address, name, address.

The process for matching the data according to some embodiments is summarized in the following steps, and is shown in FIG. 4:

System creates data file(s) that includes name, address, phone number, UDID, or MAC address or other identifiers to be used for matching audience and transmits to Data Processor over a secure channel.

System also provides Buyer Audience attributes, i.e. Furniture Buyer, in the data file which will ultimately be used by E2M's Partner for targeting.

The System file is sent to a Data Processor and is compared against the Partner file to identify matching records for output.

The output file referred to as System Match Set is constructed to include Partner's record identifier (ANONYMOUS-ID) and the System's target attributes.

No Personal Identifiable Information (PII) is included in the output file from Data Processor to Partner.

During the match, the Independent Data Processor appends System Buyer_Audience level information to Partner's file where there is a PII match. After the match occurs all non-matching information can be discarded.

Match Output:

System Match Set is transmitted from Data Processor to Partner's Data Store where it will be provisioned for digital advertising.

Partner Targeting Process:

Data Processor transmits the output of the match process—the System Match Set to Partner over a secure channel. Partner then performs the following steps for preparing the data for targeting:

Partner normalizes the System Buyer Audience data and stores the data in their DB Anonymization of User Profiles Provisions the online ad delivery system with the System targeting data Begins Campaign Delivery Partner Anonymization of User Profiles:

Partner ad delivery is done based on anonymous ids and not on personally identifiable information such as UDID or any id associated with personally identifiable information. In order to be able to use the above match set for targeting purposes on Partner network, a forward hashing technique transforming PII-ID's into ANONYMOUS-ID's occurs.

Note:

Data keyed off ANONYMOUS-IDs and PII-IDs are kept in separate operational environments and do not co-locate by policy.

There are no lookup tables to correlate ANONYMOUS-IDs and PII-IDs

Translation from PII-ID to ANONYMOUS-ID is one way.

These anonymous profiles are then moved into a User Profile Store to be provisioned for Ad Delivery.

Partner Provisioning Ad Delivery Service

As described before, each user active on the Partner network may have at least one Partner anonymous identifiers (ANONYMOUS-IDs) associated with them. Partner ad delivery system can delivers ads based off this identifier ANONYMOUS-ID. Whenever a user is on a Partner network, the ad delivery request from the browser request will be associated with the user ANONYMOUS-ID. That browser request can be fulfilled by Partner.

Ads using System data are delivered when the ad delivery system sees a user with defined System Attribute 1 set specified for that particular campaign.

Option 2: Real-Time Provisioning of Audience Level Data for Ad Servers and Ad Networks The System can integrate with partner Ad Servers and Ad Networks such that at the time a request is made within their Ad Serving platform to Get_Offer, i.e., display an advertisement, the Ad Serving platform will make a request of the System Target Data Engine. During this call to System's Recommendation Engine, the Ad Server supplies System with a mobile device identifier, such as a hashed UDID or a location. The system can then return the audience data that is relevant for this device or location. The Ad Server will then use the audience data provided by System to select an ad to display. This is shown in FIG. 4.

In accordance with some embodiments, the Get_Audience request may have a format that includes:

PID: Partner ID Assigned by System to identify the source of the request

RT: Location (1) or Device (0). Default is device.

DID: An identifier that is a SHA-1 hashed mobile number, Device ID (UDID, IMEI, MEID, ESN), MAC address, or cookie ID that will be used by E2M to retrieve the audience data for a Device request. If this is a location request this field should be used as a Partner-generated tracking ID for the request/response.

LLAT: The latitude of the location collected from the device for a Device request (if available) or the latitude of the location that an aggregate audience is being requested for.

LLON: The longitude of the location collected from the device for a Device request (if available) or the longitude of the location that an aggregate audience is being requested for.

The request tag is a fully qualified URL, with a set of querying parameters:

URL Syntax:

```
http://on.spot.extendtomobile.com/onspot.js?PID=<PartnerID>&RT
=<Value>&DID=<Hashed_ID_VALUE>&LLAT=<Latitude>&LLON=
<Longitude>
```

The Audience_Data response tag will have a different format for a device vs. location request. Either type of response can be one of these 3 types: script, image, or i-frame. Each partner will provide System with the required format/syntax for their response tag.

Device Request Response.

The device request response will simply return the targeting information for the hashed device ID sent in the request along with the audience categories that the device belongs to. An example of a response would be:

```
http://www.ThePartner.com?DID=<Hashed_ID_Value>&id=D045&id=C00
   1&id=C004
```

This response above returns three audience segments for the device ID requested, and the ad network can now select an ad based on this.

Location Request Response.

A location request response can return the targeting data for an aggregated audience at a specific location. For example, if System finds 100 people near the location coordinates passed in the request, it will identify that 10 are in D045, 1 is in C001, and 25 are in C004 audiences. The response would look something like:

```
http://www.ThePartner.com?DID=<Partner_Tracking_ID>&tot=100&id=CO
    O4&cnt=25&id=D045&cnt=10&id=C001&cnt=1
```

This provides the partner with the total audience size and the audience size by category, so they can decide on quantity vs. quality for their ad decision.

Specific items of the Response Tag can be customized in accordance with various embodiments by:

Delimiter: The partner can indicate a single character to use to delimit the segment between elements. The most common is "&"

Suffix: The partner can include additional static information that will be appended to the Response Tag, which can be additional name/value elements.

Type: The partner can specify a script, image, or i-frame tag.

Option 3: Automatic Provisioning of Audience Level Data For Ad Servers and Ad Networks The system can integrate with our partner Ad Servers and Ad Networks such that we send them targeting data for every known Audience member in the System database. This can be transmitted periodically using the same type of response format as in Option 2 or as a file transfer using secure FTP.

Custom Audiences: Reducing ad server processing

The previous discussion centered on transmitting System standard audiences to the partner. System can also build and provision custom audiences for a partner. For example, if an advertiser wants to show their ad to Hispanic Furniture buyers with income between $100,000 and $150,000. These traits correspond to the System's standard audiences D047 (Hispanic), D104 (Income 100-150), and C001 (Furniture). System can run an offline process to build a custom audience—P1001 that has all of these traits already analyzed, so that when the System reports back to the ad server in its response the ad server would just have to look at P1001 to see if it should show that advertiser's ad rather than trying to cross-check all the criteria in real time, especially if there is a large amount of selection criteria.

To do this the ad network would have to notify System of the ad campaign in advance and provide the advertiser's criteria so that the System could provision the audience. Goal for time to provision is <1 business day from receipt of the partner request.

Function 7. Interactive Tools for Querying the Datamart.

To provide additional value to customers a number of interactive reporting tools can be made available via a website, mobile device, computer, or other platform. These reporting tools include, but are not limited to:

1. Audience count tool: The system can provide a real-time interface where a user can select criteria from the data available in the database and get a real-time count of the number of devices in the database that match the criteria. This basic information enables sales teams or advertisers to interactively estimate audience sizes for ad campaigns, in addition to can other potential uses for this type of count data. By augmenting the basic count data with other data such as number of ad requests that a device makes each day on a particular ad network it is possible to build more comprehensive models of the number of ad impressions that are possible on a particular ad network and compare effectiveness and reach of different ad networks.

2. Location device count and profile: A user can enter a location, e.g., street address or latitude/longitude, and get a report of the number of devices that have been seen at that location, or in real-time how many are currently at that location. The user can select criteria to get reports that break information down by different date/day/time periods and create statistical profile reports based on information stored in the data mart in the system.

3. Location-based audiences: The system can provide an interface for a user to enter a location or set of locations and tag them with a set of data characteristics that can be used in queries against the data mart to identify devices with specific criteria. For instance, a user might enter a set of locations and identify them with the following data characteristics: "Jewelry Store", "High End" or "Mall". This data could come from Point of Interest databases, governmental databases such as a chamber of commerce database, retailer database, or any other commercial or private database, or be entered manually.

Once the new data characteristics are stored in the system, a user could enter a query to "find all devices that have visited a high end jewelry store in the last 14 days". The system would be able to identify all devices that have been at these locations, and build a profile report on the characteristics of the individuals/households associated with those devices. In addition, the system could take the results and build a list of devices that could be targeted as an "in-market" audience.

Note that these types of audiences could be built in real-time by setting a trap query so that every time the system receives and processes mobile device location data, any device that matches one of the locations in the trap query would automatically be added to the audience. This audience could them be made available to users via the methods in Function 6 above.

4. Location-based profiles: Reports can be generated for retailers or others seeking information about the individuals that visit or are near a physical location. For instance, a retailer may want to know who passes by their store each day, whether they come in or not. The system can provide an interface to enter a street location or latitude/longitude, in addition to time segments (day/date/time) and provide a profile report based on the devices that meet this criteria. This information can be used to build devices lists for mobile ad campaigns, or to perform analysis on origin and movement behavior of the devices.

INDUSTRIAL APPLICABILITY

The data from multiple mobile event data sources results in rapidly building a very large set of mobile device IDs that can be linked back to a myriad of data sources. While most applicable to smartphones and tablet devices that are large consumers of mobile data services today, it will eventually encompass the entire mobile device population as consumers adopt these devices over the next few years.

By providing information on the individuals associated with the mobile device, the system enables a number of different solutions to be built that include, but are not limited to:

Intelligent solutions—access to data enables applications and services to customize the service delivery or user experience based on the data provided. This can a financial application offering different financial solutions to a potential customer based on age, income, and investment information, or a mobile ad network delivering a different ad based on an individual's shopping interest or brand preference.

Analytic solutions—these solutions provide composite views of the population at a given area at different times. Think of retailers planning new store locations wanting to understand the people that come to a particular shopping center or street. Or city planners that want to understand the commuting patterns for a particular area by looking at different times of the day.

Situational awareness solutions—these solutions provide real-time views and information for public safety, homeland security, first responders, etc. Examples include being able to identify the probable number of people at an incident location, with information on age, health conditions, criminal background, etc.

These are just a few of the applications, because every business and government agency has a wealth of data that they use today and would like to associate with mobile devices and users to expand their utility.

1. The system can provide identification of mobile devices to an individual or household that can be used to provide matching back to any database that uses an address as a key element to identify the data.
2. The system can provide identification of mobile devices wherein the system can be used with any type of mobile device identifier such as UDID, Wi-Fi MAC Address, Bluetooth ID, browser cookies, or any other persistent or semi-persistent identifier. A semi-persistent identifier is one that exists for some period of time before it is changed, which could be a day, week, month, or more.
3. The system can provide identification of mobile devices wherein the system can be used with any type of mobile device on a cellular or Wi-Fi network, using any type of service plan including subscription, corporate, prepaid, etc.
4. The system can provide identification of mobile devices with cross-matching of various mobile device identifiers to a single anonymous identifier.
5. The system can provide identification of mobile devices with anonymization of the data so that privacy is protected when the data is used for commercial purposes.
6. The system can provide identification of mobile devices which can be used with any mobile device data that includes the following elements: 1) a mobile device identifier and 2) geo-location tag. A time/date stamp associated with the mobile device data is desirable and may or may not be required for linking devices to a database, but is required for some applications and analysis to deliver different services.
7. The system can provide identification of mobile devices which works with any mobile device location data and accounts for the variance in accuracy of mobile location data depending on the source of the data.
8. The system can provide identification of mobile devices which can take both real-time data as well as batch data.
9. The system can provide identification of mobile devices which the system provides for the delivery of linked data to commercial services, businesses, government, and other customers in two ways—1) in response to a query about an individual device, or 2) in response to a query about a location.
10. The system can provide identification of mobile devices which does not require any subscriber data from a mobile carrier to link devices back to any database.
11. The system can provide identification of mobile devices which does not require any location data from a mobile carrier.
12. The system can provide identification of mobile devices which can identify "social networks" of devices with common interests based on location data, which can be linked back to commercial databases for analytical purposes.
13. The system can provide identification of mobile devices which can identify "social networks" based on a single selected location input into the system or based on multiple locations that are generated autonomously by the system analysis.

Exemplary Computer System Overview

Embodiments of the present technology include various steps and operations, which have been described above. A variety of these steps and operations may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware. As such, FIG. 6 is an example of a computer system 600 with which embodiments of the present technology may be utilized. Computer system 600 is an example of a means for implementing the functionality and performing several of the operations described above. According to the present example, the computer system includes a bus 610, at least one processor 620, at least one communication port 630, a main memory 640, a removable storage media 650, a read only memory 660, and a mass storage 670.

Processor(s) 620 can be any known processor, such as, but not limited to, Intel® lines of processors; AMD® lines of processors; or Motorola® lines of processors. Communication port(s) 630 can be any of an RS-232 port for use with a modem-based dialup connection, a 60/100 Ethernet port, or a Gigabit port using copper or fiber. Communication port(s) 630 may be chosen depending on a network such as a Local Area Network (LAN), Wide Area Network (WAN), or any network to which the computer system 600 connects.

Main memory 640 can be Random Access Memory (RAM) or any other dynamic storage device(s) commonly known in the art. Read only memory 660 can be any static storage device(s) such as Programmable Read Only Memory (PROM) chips for storing static information such as instructions for processor 620.

Mass storage 670 can be used to store information and instructions. For example, hard disks such as the Adaptec® family of SCSI drives, an optical disc, an array of disks such as RAID, such as the Adaptec family of RAID drives, or any other mass storage devices may be used.

Bus 610 communicatively couples processor(s) 620 with the other memory, storage and communication blocks. Bus 610 can be a PCI/PCI-X or SCSI based system bus depending on the storage devices used.

Removable storage media 650 can be any kind of external hard-drives, floppy drives, solid state storage drives, cloud storage systems, IOMEGA® Zip Drives, Compact Disc- Read Only Memory (CD-ROM), Compact Disc-Re-Writable (CD-RW), and/or Digital Video Disk-Read Only Memory (DVD-ROM).

The components described above are meant to exemplify some types of possibilities. In no way should the aforementioned examples limit the scope of the technology, as they are only exemplary embodiments.

Embodiments of the present technology may be implemented using a combination of one or more modules or engines. For example, embodiments provide for a graphical user interface generation module to generation one or more graphical user interface screens to convey results/information and take instructions, a general-purpose or special-purpose "communications module" for interfacing with various components and databases, a "data gathering module" to collect information from various sources, an "anonymization module" to anonymize data, a "rating module" to rate the quality of a residential match, a "linking module" to link an address to a mobile device, "social graph module" to group devices based on one or more spatial and temporal analyzes, a "reporting module" to generate device and location reports, as well as other modules and engines for providing various functionality needed by embodiments of the present technology. Still yet, various embodiments may incorporate two or more of these modules into a single module and/or associate a portion of the functionality of one or more of these modules with a different module. Each of these modules and engines provides examples of the means for implementing functionality and performing operations described herein.

Various modifications and additions can be made to the embodiments discussed without departing from the scope of the present technology. For example, while the embodiments described above refer to particular features, the scope of this technology also includes embodiments having different combinations of features and embodiments that do not include all of the described features. Accordingly, the scope of the present technology is intended to embrace all such alternatives, modifications, and variations and all equivalents thereof.

What is claimed is:

1. A method of associating a mobile device to a household, the method comprising:
   receiving a plurality of latitude-longitude pairs for a mobile device, the latitude-longitude pairs corresponding to a location of the mobile device during a time period;
   organizing the plurality of latitude-longitude pairs into a plurality of clusters, the clusters corresponding to geographic regions visited by the mobile device during the time period;
   calculating a score for each cluster, the score representing a likelihood that a user of the mobile device resides in a household within the cluster;
   identifying a location of the user's household, the location corresponding to the cluster having the highest score; and
   associating the mobile device with the user's household.

2. The method of claim 1, wherein the latitude-longitude pairs are obtained using a technique selected from the group consisting of global positioning with a global positioning system, cellular triangulation, and/or WiFi identification.

3. The method of claim 1, wherein the time period is selected from an hour, a day, a week, or a month.

4. The method of claim 1, wherein the mobile device is selected from a cellular phone, a portable computing device, and a tablet computer.

5. The method of claim 1, wherein the latitude-longitude pairs are associated with an ad request sent by the mobile device.

6. The method of claim 1, wherein calculating the score comprises applying a weight based on at least one of a time and a location associated with a longitude-latitude pair.

7. The method of claim 6, wherein the weight is based on the time associated with the latitude-longitude pair, according to a likelihood that the mobile device was in the household at the time.

8. The method of claim 6, wherein the weight is based on the location associated with the latitude-longitude pair, according to a likelihood that the location corresponds to a residential location.

9. The method of claim 1, further comprising rejecting a latitude-longitude pair based on an indication that the latitude-longitude pair is erroneous.

10. The method of claim 1, further comprising:
    receiving, during a second time period, a plurality of second latitude-longitude pairs for the mobile device, the second latitude-longitude pairs corresponding to a location of the mobile device during the second time period;
    organizing the plurality of second latitude-longitude pairs into a plurality of second clusters, the second clusters corresponding to geographic regions visited by the mobile device during the second time period;
    calculating a second score for each second cluster, the second score representing a likelihood that the user of the mobile device resides in a household within the second cluster; and
    identifying a second location of the user's household, the second location corresponding to the second cluster having the highest second score.

11. The method of claim 10, further comprising performing a state update, the state update comprising:
    determining whether the location of the user's household and the second location of the user's household are consistent;
    if the location and the second location are consistent, determining a revised location of the user's household as a function of the location and the second location;
    if (i) the location and the second location are not consistent, and (ii) the highest second score is less than or equal to the highest score, associating the mobile device with the location; and
    if (i) the location and the second location are not consistent, and (ii) the highest second score is greater than the highest score, associating the mobile device with the second location of the user's household.

12. The method of claim 1, further comprising assigning statistical metrics to measure fitness of the device ID and household ID association.

13. A system for associating a mobile device to a household, the system comprising:
    a data storage device operating on a server computer, the data storage device storing a plurality of latitude-longitude pairs for a mobile device, the latitude-longitude pairs corresponding to a location of the mobile device during a time period; and
    a processor for executing computer-readable instructions that, when executed:
        organize the plurality of latitude-longitude pairs into a plurality of clusters, the clusters corresponding to geographic regions visited by the mobile device during the time period;

calculate a score for each cluster, the score representing a likelihood that a user of the mobile device resides in a household within the cluster;

identify a location of the user's household, the location corresponding to the cluster having the highest score; and associate the mobile device with the user's household.

14. The system of claim 13, wherein the latitude-longitude pairs are obtained using a technique selected from the group consisting of global positioning with a global positioning system, cellular triangulation, and/or WiFi identification.

15. The system of claim 13, wherein the time period is selected from an hour, a day, a week, or a month.

16. The system of claim 13, wherein the mobile device is selected from a cellular phone, a portable computing device, and a tablet computer.

17. The system of claim 13, wherein the latitude-longitude pairs are associated with an ad request sent by the mobile device.

18. The system of claim 13, wherein calculating the score comprises applying a weight based on at least one of a time and a location associated with a longitude-latitude pair.

19. The system of claim 18, wherein the weight is based on the time associated with the latitude-longitude pair, according to a likelihood that the mobile device was in the household at the time.

20. The system of claim 18, wherein the weight is based on the location associated with the latitude-longitude pair, according to a likelihood that the location corresponds to a residential location.

21. The system of claim 13, wherein the computer-readable instructions, when executed, further reject a latitude-longitude pair based on an indication that the latitude-longitude pair is erroneous.

22. The system of claim 13, wherein the computer-readable instructions, when executed:

receive, during a second time period, a plurality of second latitude-longitude pairs for the mobile device, the second latitude-longitude pairs corresponding to a location of the mobile device during the second time period;

organize the plurality of second latitude-longitude pairs into a plurality of second clusters, the second clusters corresponding to geographic regions visited by the mobile device during the second time period;

calculate a second score for each second cluster, the second score representing a likelihood that the user of the mobile device resides in a household within the second cluster; and identify a second location of the user's household, the second location corresponding to the second cluster having the highest second score.

23. The system of claim 22, wherein the computer-readable instructions, when executed, perform a state update comprising:

determining whether the location of the user's household and the second location of the user's household are consistent;

if the location and the second location are consistent, determining a revised location of the user's household as a function of the location and the second location;

if (i) the location and the second location are not consistent, and (ii) the highest second score is less than or equal to the highest score, associating the mobile device with the location; and if (i) the location and the second location are not consistent, and (ii) the highest second score is greater than the highest score, associating the mobile device with the second location of the user's household.

24. The system of claim 13, wherein the computer-readable instructions, when executed, assign statistical metrics to measure fitness of the device ID and household ID association.

25. A computer program product embodied on a non-transitory computer-readable medium and comprising computer code for associating a mobile device to a household, the code comprising instructions stored in a data storage medium and executable on a processing device; and, when executed by the processing device, the processing device:

receives a plurality of latitude-longitude pairs for a mobile device, the latitude-longitude pairs corresponding to a location of the mobile device during a time period;

organizes the plurality of latitude-longitude pairs into a plurality of clusters, the clusters corresponding to geographic regions visited by the mobile device during the time period;

calculates a score for each cluster, the score representing a likelihood that a user of the mobile device resides in a household within the cluster; identifies a location of the user's household, the location corresponding to the cluster having the highest score; and associates the mobile device with the user's household.

* * * * *